UNITED STATES PATENT OFFICE.

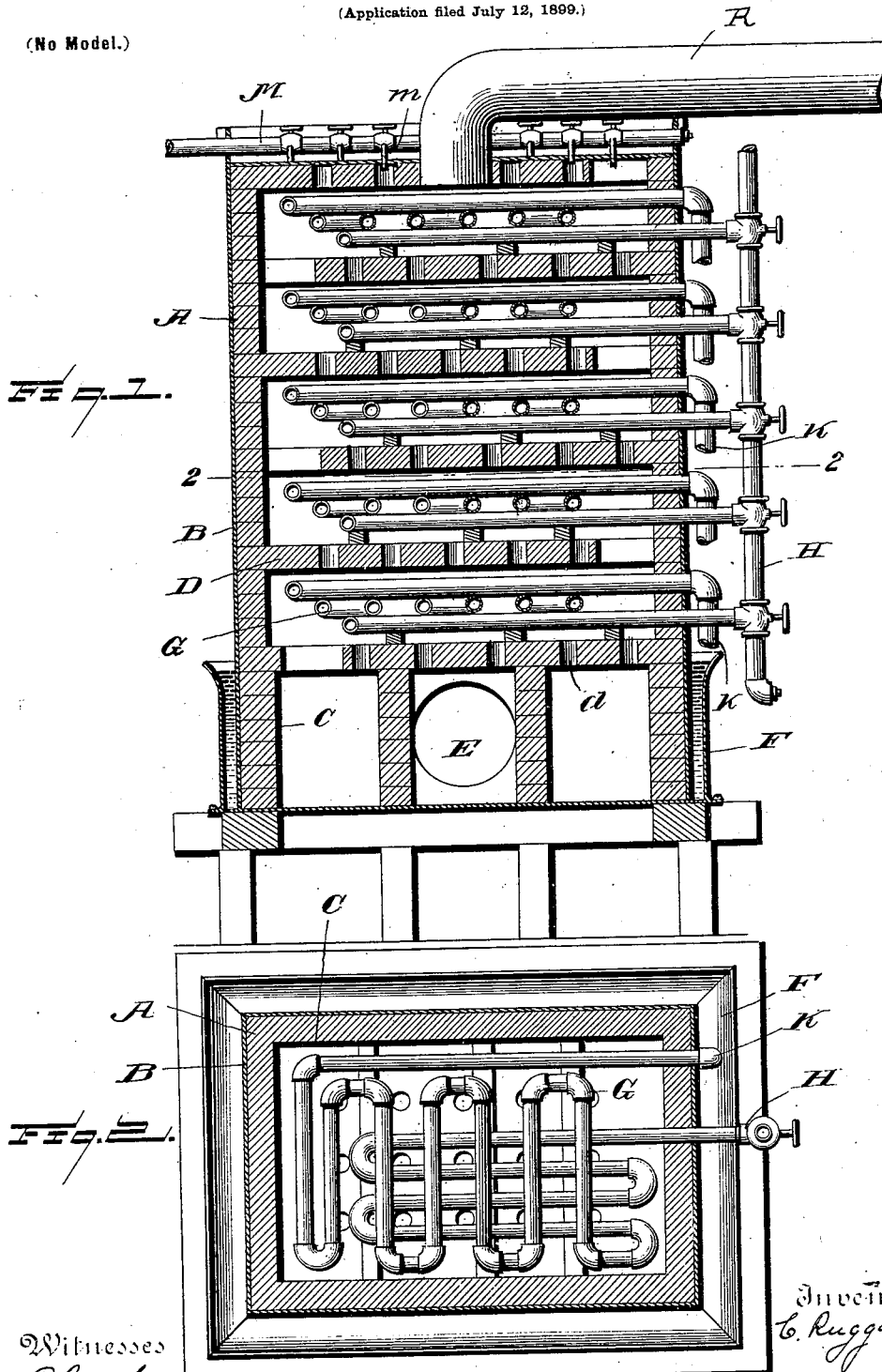

CONSTANTIN RUGGABER, OF RICHMOND, VIRGINIA, ASSIGNOR OF ONE-HALF TO HOWARD HARLAN, OF SAME PLACE.

ACID-COOLING TOWER.

SPECIFICATION forming part of Letters Patent No. 645,235, dated March 13, 1900.

Application filed July 12, 1899. Serial No. 723,556. (No model.)

*To all whom it may concern:*

Be it known that I, CONSTANTIN RUGGABER, a citizen of the United States, residing at Richmond, in the county of Henrico and State of Virginia, have invented certain new and useful Improvements in Cooling-Towers for Sulfuric-Acid Gas; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in cooling-towers for use in the manufacture of sulfuric acid; and it consists in the provision of means whereby the gas is caused in its ascent to come into contact with cold-water coils which are disposed in the various shelved compartments of the tower, whereby the gas becomes condensed when it reaches the upper portion of the series of cooling-coils.

More specifically the present invention resides in the provision of a cooling-tower made of suitable masonry and having a suitable acid-resisting lining and provided with a series of shelves dividing the interior of the tower into a series of compartments, with alternately-disposed openings at the sides of the inclosure, whereby the gas is made to travel back and forth from one compartment to another in its ascent, thus bringing it in contact with separate cooling-coils, one or more in each compartment. In connection with the foregoing a lead water-jacket surrounds the lower portion of the tower, where the gas at its highest temperature enters the cooling-chambers.

To these ends and to such others as the invention may pertain the same consists, further, in the novel construction, combination, and adaptation of parts, as will be hereinafter more fully described and then specifically defined in the appended claim.

My invention is clearly illustrated in the accompanying drawings, which, with the letters of reference marked thereon, form a part of this application, and in which—

Figure 1 is a central vertical section through the tower. Fig. 2 is a sectional view horizontally through the tower.

Reference now being had to the details of the drawings by letter, A designates the wall of the tower, made of masonry and surrounded, preferably, with a sheathing of lead B and lined with an acid-proof material, as at C. The interior of the inclosure formed by the outside walls is divided into a series of compartments by means of the shelves or partitions D, and the free edges of these shelves are arranged alternately to one another, as shown in the drawings, whereby the gas is made to travel the entire width of the tower in passing from one compartment to another in its ascent. The bottoms of these shelves or partitions are made, preferably, of a tiling or other acid-resisting material, and in the shelves is a series of perforations $d$, which are provided primarily to allow the interior of the tower to be washed out.

The gas enters the tower through the opening E, to which a pipe may be connected, and surrounding the lower portion of the tower is a cooling-receptacle F, made, preferably, of sufficient height to extend up above the portion into which the gas enters at its highest temperature. Through this receptacle the pipe leading to the opening E is designed to pass gas-tight. This pipe, however, does not show in the drawings. Leading away from the upper end of the tower is a pipe R, through which the gas is allowed to escape.

Between each shelf is a coil of lead pipe G, which is connected with a vertical pipe H, through which water passes to the coil. Each coil is separate from the other and each has a separate outlet-pipe K, whereby the water in the various coils, when it has become heated from absorbing heat from the gas, may run freely out and fresh cold water run through the coils.

At the upper end of the tower is a pipe M, from which lead jets $m$, through which weak acid may be allowed to come in contact with the partially-condensed gas which rises to the top of the tower.

From the foregoing it will be noted, when taken in connection with the drawings, that I produce an apparatus for making sulfuric acid, nitric acid, and other acids for which the device may be applicable by the employment of the smallest amount of space possible. The gas becomes quickly cooled, and the apparatus may be washed out by the peculiar arrangement of the perforated shelves.

Having thus described my invention, what I claim to be new, and desire to secure by Letters Patent, is—

A cooling-tower having walls of masonry with outer sheathing of lead and mounted on a suitable platform, a series of alternately-arranged perforated shelves supported on the inner walls of the tower, a water-cooling jacket surrounding the portion of the tower below the bottom of said shelves, the inlet-pipe passing water-tight through the walls of said jacket and sheathing, and the coils between each shelf, the outlet end of each coil being downwardly disposed and positioned to discharge into said cooling-jacket, all as shown and described and for the purpose set forth.

In testimony whereof I affix my signature in presence of two witnesses.

CONSTANTIN RUGGABER.

Witnesses:
　H. C. LEONARD,
　G. R. DRINKER.